United States Patent [19]
Tetrick

[11] Patent Number: 6,006,301
[45] Date of Patent: *Dec. 21, 1999

[54] MULTI-DELIVERY SCHEME INTERRUPT ROUTER

[75] Inventor: Raymond S. Tetrick, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/941,149

[22] Filed: Sep. 30, 1997

[51] Int. Cl.[6] .................................................. G06F 13/00
[52] U.S. Cl. .......................... 710/128; 710/129; 710/260
[58] Field of Search ...................................... 395/733, 739, 395/734, 735, 736, 742, 740, 741

[56] References Cited

U.S. PATENT DOCUMENTS

| | | | |
|---|---|---|---|
| 4,967,342 | 10/1990 | Lent et al. ............................... | 395/733 |
| 5,101,497 | 3/1992 | Culley et al. ............................ | 395/725 |
| 5,381,541 | 1/1995 | Begun et al. ............................ | 395/325 |
| 5,619,705 | 4/1997 | Karnik et al. ............................ | 395/739 |
| 5,640,571 | 6/1997 | Hedges et al. ........................... | 395/734 |
| 5,708,813 | 1/1998 | Cho et al. ................................ | 395/733 |
| 5,721,931 | 2/1998 | Gephardt et al. ........................ | 395/733 |
| 5,745,772 | 4/1998 | Klein ........................................ | 395/739 |
| 5,778,236 | 7/1998 | Gephardt et al. ........................ | 395/739 |
| 5,778,242 | 7/1998 | Wang ................................... | 395/800.4 |

FOREIGN PATENT DOCUMENTS 0535821  4/1993  European Pat. Off. ........ G06F 15/16

OTHER PUBLICATIONS

Interrupt web pages—PC Webopaedia Definition and Links; http://webopedia.internet.com/TERM/i/interrupt.html; 2 pages, (printed May 31, 1999).

Interrupt web pages—PC Guide; http://www.pcguide.com/ref/res/mbsys/res/irq/func.htm; pp. 1–13, (printed May 31, 1999).

Data Sheet for the 8259a Programmable Interrupt Controller (8259A/8259A–2); www.intel.com; pp. 1–24, (printed May 31, 1999).

*Primary Examiner*—Ayaz R. Sheikh
*Assistant Examiner*—David A. Wiley
*Attorney, Agent, or Firm*—Blakely, Sokoloff, Taylor & Zafman LLP

[57] ABSTRACT

An interrupt router includes a first interface. The first interface is coupled to a first interrupt delivery medium. The interrupt router includes a second interface. The second interface is coupled to a second interrupt delivery medium. The interrupt router includes an interrupt routing unit. The interrupt routing unit is coupled to the first interface and the second interface. The interrupt routing unit routes interrupts originating from the first interrupt delivery medium and the second interrupt delivery medium to a input/output (I/O) bus.

30 Claims, 8 Drawing Sheets

| PIRQ | VECTOR | DEST ID | FLUSH | MASK | TRIGGER | POLARITY | DELIVERY MODE | DESTINATION MODE | DELIVERY MODE |
|---|---|---|---|---|---|---|---|---|---|
| PIRQ 1 | 55 | 1001B | 0 | 1 | 1 | 1 | 0 | 1 | 110 |
| PIRQ 2 | 60 | 10000 | 0 | 0 | 1 | 1 | 0 | 1 | 100 |
| • | • | • | • | • | • | • | • | • | • |
| • | • | • | • | • | • | • | • | • | • |
| • | • | • | • | • | • | • | • | • | • |
| PIRQ N | 85 | 1000B | 0 | 0 | 1 | 1 | 0 | 1 | 011 |

FIG. 6

MULTI-DELIVERY SCHEME INTERRUPT ROUTER

FIELD OF THE INVENTION

The present invention relates to the field of computer systems. More specifically, the present invention relates to the field of interrupt routers that route interrupts from a peripheral to a processor in a computer system.

BACKGROUND

A traditional interrupt routing scheme for a single processor computer system typically includes an interrupt controller in the bus bridge. The interrupt controller is connected to a plurality of peripherals via dedicated lines. When one of the peripherals requires servicing from the processor in the computer system, it asserts its corresponding dedicated line. Upon determining an appropriate time, the interrupt controller interrupts the processor which allows it to service the peripheral.

The advanced programmable interrupt controller (APIC) architecture is an interrupt scheme that supports multiple processor computer systems. Computer systems implementing the APIC architecture incorporate an input/output (I/O) APIC within a bus bridge and an interrupt router, and a local APIC unit within each host processor. The I/O APIC of the interrupt router communicates with the local APICs of the host processors over a dedicated 3-wire APIC bus. With this arrangement, interrupt signals generated by the I/O devices are routed to the I/O APIC of the interrupt router or the bus bridge. The I/O APIC converts the interrupts to APIC standard interrupts for routing to the host processors over the APIC bus.

Current interrupt routers that support the traditional and APIC interrupt routing schemes are dedicated to servicing a single interrupt delivery scheme and are not programmable to support a plurality of interrupt routing schemes. This translates to additional costs for manufacturers who must stock a plurality of different types of interrupt routers for supporting the different interrupt routing schemes used by computer systems.

SUMMARY

An interrupt router according to an embodiment of the present invention is disclosed. The interrupt router includes a first interface. The first interface is coupled to a first interrupt delivery medium. The interrupt router includes a second interface. The second interface is coupled to a second interrupt delivery medium. The interrupt router includes an interrupt routing unit. The interrupt router is coupled to the first interface and the second interface. The interrupt router routes interrupts originating from the first interrupt delivery medium and the second interrupt delivery medium to an input/output (I/O) bus.

BRIEF DESCRIPTION OF THE DRAWINGS

The present invention is illustrated by way of example and not be way of limitation in the figures of the accompanying drawings, in which like references indicate similar elements and in which:

FIG. 6 illustrates an exemplary routing table in an interrupt router configured to support a computer system implementing an APIC interrupt routing scheme according to an embodiment of the present invention;

DETAILED DESCRIPTION

Figure 1:
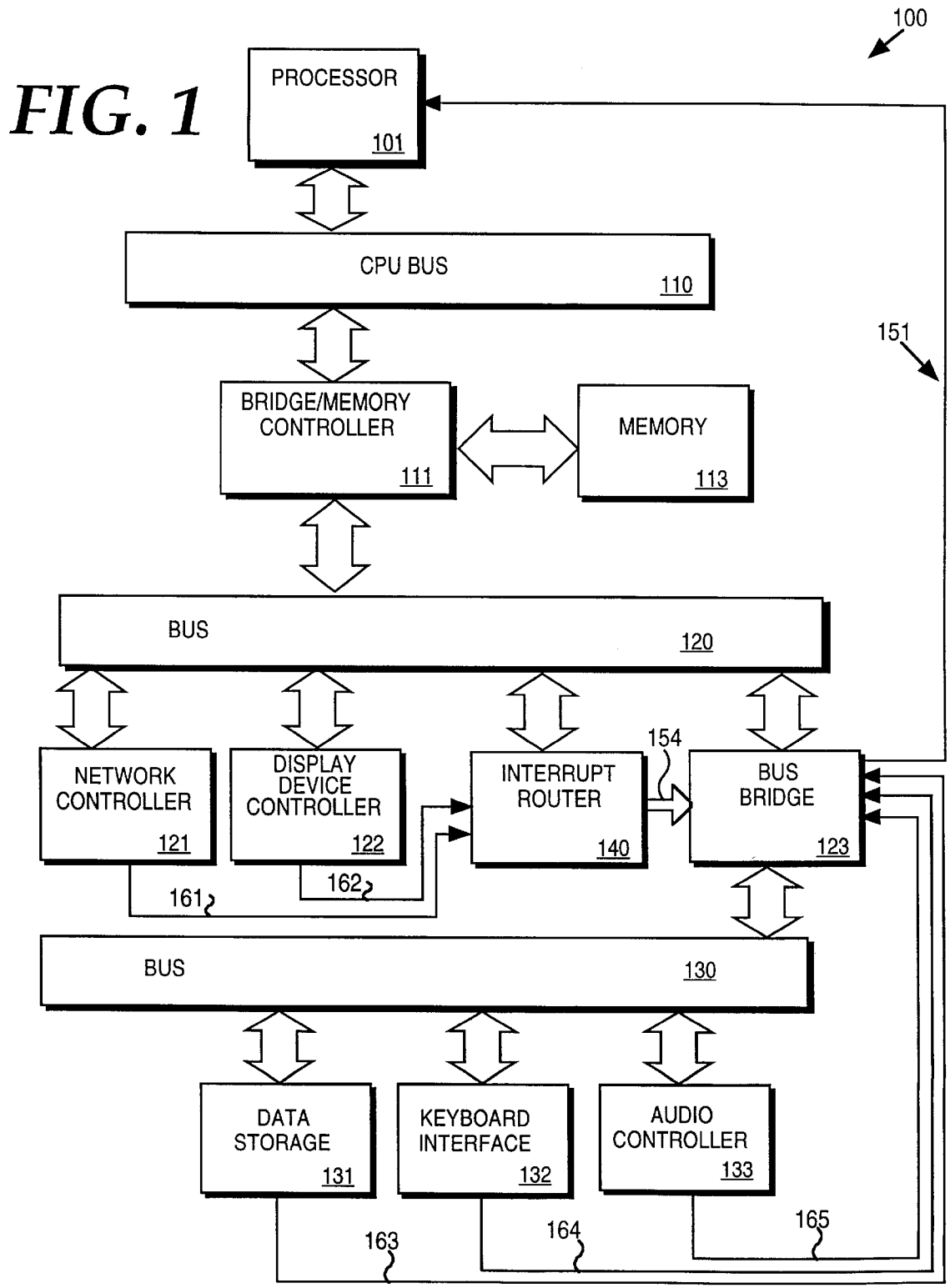
FIG. 1 illustrates a block diagram of a computer system implementing a traditional interrupt routing scheme according to an embodiment of the present invention.

Referring to FIG. 1, a computer system implementing a traditional interrupt routing scheme according to an embodiment of the present invention is shown. The computer system 100 comprises a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention can be implemented in a computer system having multiple processors. The processor 101 is coupled to a bus 110 that transmits data signals between the processor 101 and other components in the computer system 100.

As an example, memory 113 may comprise a dynamic random access memory (DRAM) device, a static random access memory (SRAM) device, or other memory device. The memory 113 stores data signals that may be executed by the processor 101. A bridge memory controller 111 is coupled to the bus 110 and the memory 113. The bridge memory controller 111 directs data traffic between the processor 101, the memory 113, and other components in the computer system 100 and bridges signals from these components to a high speed input/output (I/O) bus 120.

The high speed I/C) bus 120 supports peripheral operating at high data throughput rates. The high speed I/O bus 120 may be a single bus or a combination of multiple buses. As an example, the high speed I/O bus 120 may comprise a Peripheral Components Interconnect (PCI) bus, a Personal Computer Memory Card International Association (PCMCIA) bus or other buses. The high specd I/O bus 120 provides communication links between components in the computer system 100. According to a preferred embodiment of the present invention, the high speed I/O bus 120 is implemented by a PCI bus.

A network controller 121 links the computer system 100 to a network of computers and provides communication between the computer system 100 and the networked machines. A display device controller 122 is coupled to the high speed I/O bus 120. The display device controller 122 allows coupling of a display device (not shown) to the computer system 100 and acts as an interface between the display device and the computer system 100. The display device controller 122 may comprise a monochrome display adapter (MDA) card, a color graphics adapter (CGA) card, enhanced graphics adapter (EGA) card, extended graphics array (XGA) card or other display device controller. The display device may be a television set, a computer monitor, a flat panel display or other display device. The display device receives digital signals from the processor 101 through the display device controller 122 and renders the digital signals to the user of the computer system 100.

The I/O bus 130 is used for communicating information between peripheral devices that operate at lower throughput rates. The I/O bus 130 may be a single bus or a combination of multiple buses. As an example, the I/O bus 130 may comprise an Industry Standard Architecture (ISA) bus, an Extended Industry Standard Architecture (EISA) bus, a Micro Channel Architecture (MCA) bus or a PCI bus. The I/O bus 130 provides communication links between components in the computer system 100. According to a preferred embodiment of the present invention, the I/O bus 130 is implemented by an ISA or EISA bus.

A keyboard interface 132 may comprise a keyboard controller or other keyboard interface. The keyboard interface 132 may comprise a dedicated device or reside in another device such as a bus controller or other controller. The keyboard interface 132 allows coupling of a keyboard (not shown) to the computer system 100 and transmits signals from a keyboard to the computer system 100. A data storage device 131 may comprise a hard disk drive, a floppy disk drive, a CD-ROM device, a flash memory device or other mass storage device. An audio controller 133 operates to coordinate the recording and playing of sounds is also coupled to I/O bus 130.

A bus bridge 123 couples the high speed I/O bus 120 to the I/O bus 130. The bus bridge 123 operates to buffer and bridge signals between the high speed I/O bus 120 and the I/O bus 130. The bus bridge 123 is connected to the peripheral devices on the I/O bus 130 via a plurality of interrupt request ("IRQ") lines 163–165. A first IRQ line 163 connects the bus bridge 123 with the data storage device 131. A second IRQ line 164 connects the bus bridge 123 with the keyboard interface 132. A third IRQ line 165 connects the bus bridge 123 with the audio controller. When a peripheral on the I/O bus 130 requires the processor 101 to perform a service, the peripheral device transmits an interrupt request to the bus bridge 123 by asserting its corresponding IRQ line. If the service requested by the peripheral has greater priority than the current operation of the processor 101, the bus bridge 123 asserts interrupt line 151. When the interrupt line 151 line is asserted, the processor 101 executes a special interrupt service routine to handle the interrupt.

A interrupt router 140 is coupled to the high speed I/O bus 120. The interrupt router is connected to peripherals on the high speed I/O bus 120 via a plurality of Peripheral Component Interconnect interrupt request lines ("PIRQ") 161–162. A first PIRQ line 161 connects the network controller 121 to the interrupt router 140. A second PIRQ line 162 connects the display device controller 122 to the interrupt router 140. When a peripheral on the high speed I/O bus 120 requires the processor 101 to perform a service, the peripheral device transmits an interrupt request to the interrupt router 140 by asserting its corresponding PIRQ line. The interrupt router 140 operates to map the interrupt request from the PIRQ line as an interrupt request on one of the IRQ lines 154 to the bus bridge 123. If the service requested by the peripheral has greater priority than the current operation of the processor 101, the bus bridge 123 asserts interrupt line 151. The processor 101 executes a special interrupt service routine to handle the interrupt.

Figure 2:
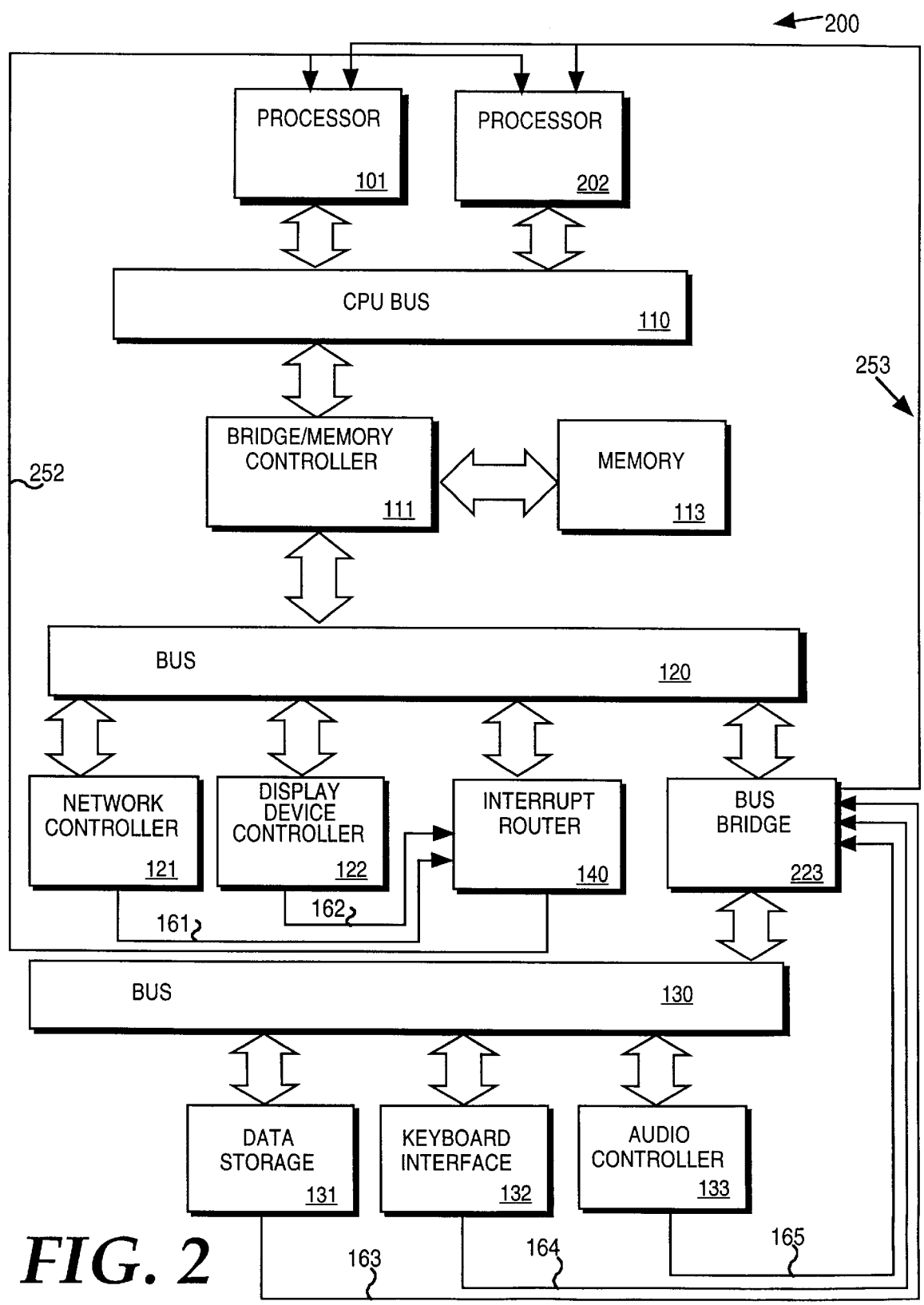
FIG. 2 illustrates a block diagram of a computer system implementing an APIC interrupt routing scheme according to an embodiment of the present invention.

FIG. 2 illustrates a block diagram of a computer system implementing an APIC interrupt routing scheme. The computer system 200 includes similar components as those in the computer system 100 shown in FIG. 1. The computer system 200 is a multi-processor computer system which includes a second processor 202 that operates similarly to the processor 101.

The computer system 200 includes a bus bridge 223 configured to deliver interrupts using the APIC interrupt delivery scheme. The bus bridge 223 is connected to the peripheral devices on the I/O bus 130 via a plurality of IRQ lines 163–165. When a peripheral on the I/O bus 130 requires one of the processors 101 or 202 to perform a service, the peripheral device transmits an interrupt request to the bus bridge 223 by asserting its corresponding IRQ line. The bus bridge 223 converts the interrupt to APIC standard interrupts for routing to the processors 101 and 202 over a first APIC bus 253.

An interrupt router 140 is coupled to the high speed I/O bus 120. The interrupt router 140 is connected to peripherals on the high speed I/O bus 120 via a plurality of PIRQ lines 161–162. When a peripheral on the high speed I/O bus 120 requires one of the processor 101 or 202 to perform a service, the peripheral device transmits an interrupt request to the interrupt router 140 by asserting its corresponding PIRQ line. The interrupt router 140 converts the interrupt to APIC standard interrupts for routing to the processors 101 and 202 over a second APIC bus 252.

Figure 3:
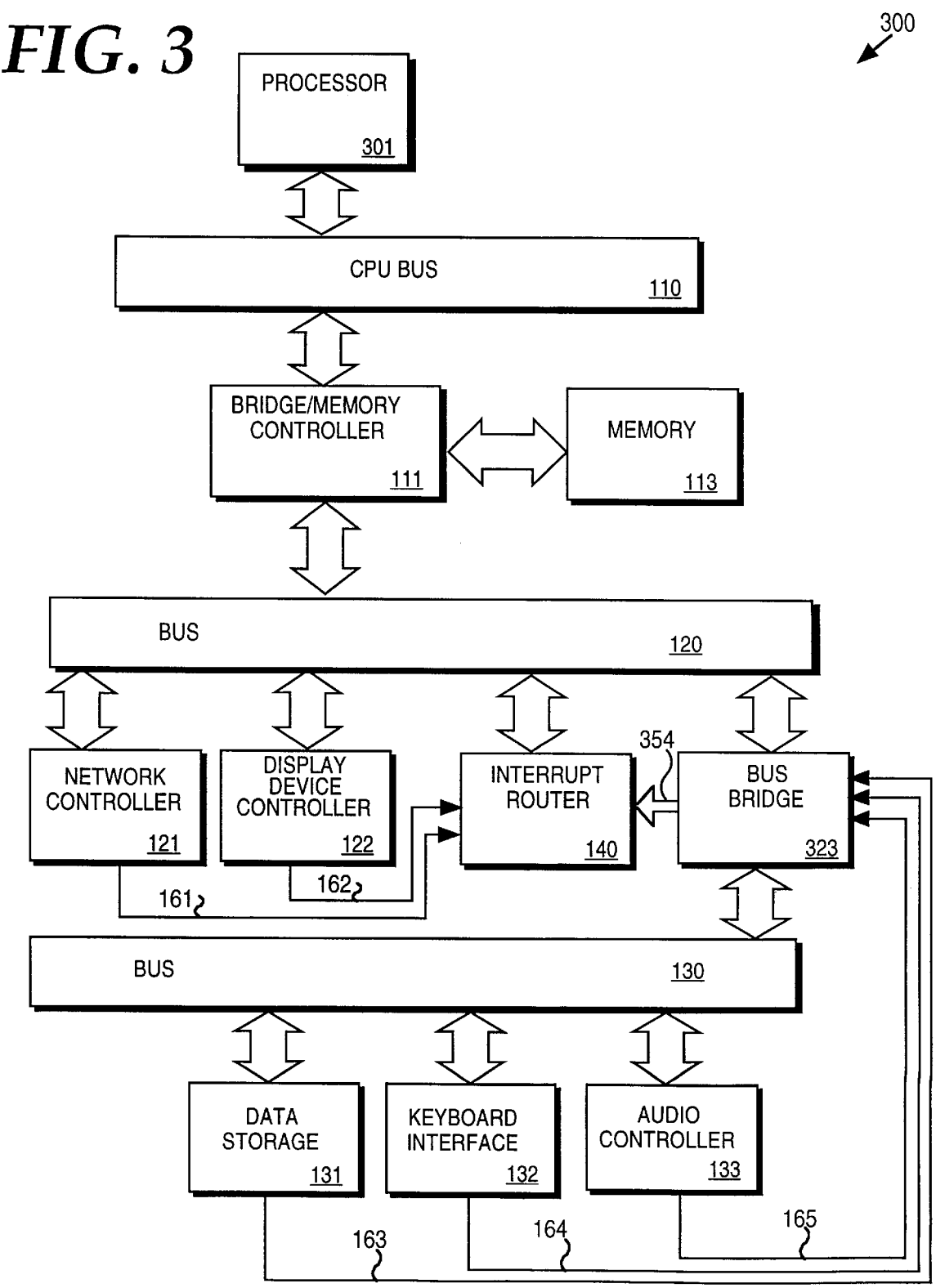
FIG. 3 illustrates a block diagram of a computer system implementing an SAPIC interrupt routing scheme according to an embodiment of the present invention.

FIG. 3 illustrates a block diagram of a computer system implementing an streamlined advanced programmable interrupt controller ("SAPIC") interrupt routing scheme. The computer system 300 may include a single processor 301, as shown, or a plurality of processors.

The computer system 300 includes a bus bridge 323 configured to deliver interrupts using the SAPIC interrupt delivery scheme. The bus bridge 323 is connected to the peripheral devices on the I/O bus 130 via a plurality of IRQ lines 163–165. When a peripheral on the I/O bus 130 requires the processor 101 to perform a service, the peripheral device transmits an interrupt request to the bus bridge 323 by asserting its corresponding IRQ line. The bus bridge 323 forwards the interrupt to the interrupt router 140 coupled to the high speed I/O bus 120 via one of the plurality of IRQ lines 354. The interrupt router 140 reformats the interrupt into an interrupt message and transmits the interrupt message over the high speed I/O bus 120. Interrupt messages are transmitted as posted memory writes from the high speed I/O bus 120 to the CPU bus 110.

The interrupt router 140 is connected to peripherals on the high speed I/O bus 120 via a plurality of PIRQ lines 161–162. When a peripheral on the high speed I/O bus 120 requires the processor 101 to perform a service, the peripheral device transmits an interrupt request to the interrupt router 140 by asserting its corresponding PIRQ line. The interrupt router 140 reformats the interrupt into an interrupt message and transmits the interrupt message over the high speed I/O bus 120. Interrupt messages are transmitted as posted memory writes from the high speed I/O bus 120 to the CPU bus 110.

For the computer systems illustrated in FIGS. 1–3, it should be appreciated that additional peripherals may be coupled to I/O bus 130 and that additional IRQ lines may be implemented to signal interrupt requests to the bus bridges 123, 223, 323. Furthermore, it should be appreciated that additional peripherals may be coupled to the high speed I/O bus 120 and that additional PIRQ lines may be implemented to signal interrupt requests to the interrupt routing unit 140.

Figure 4:
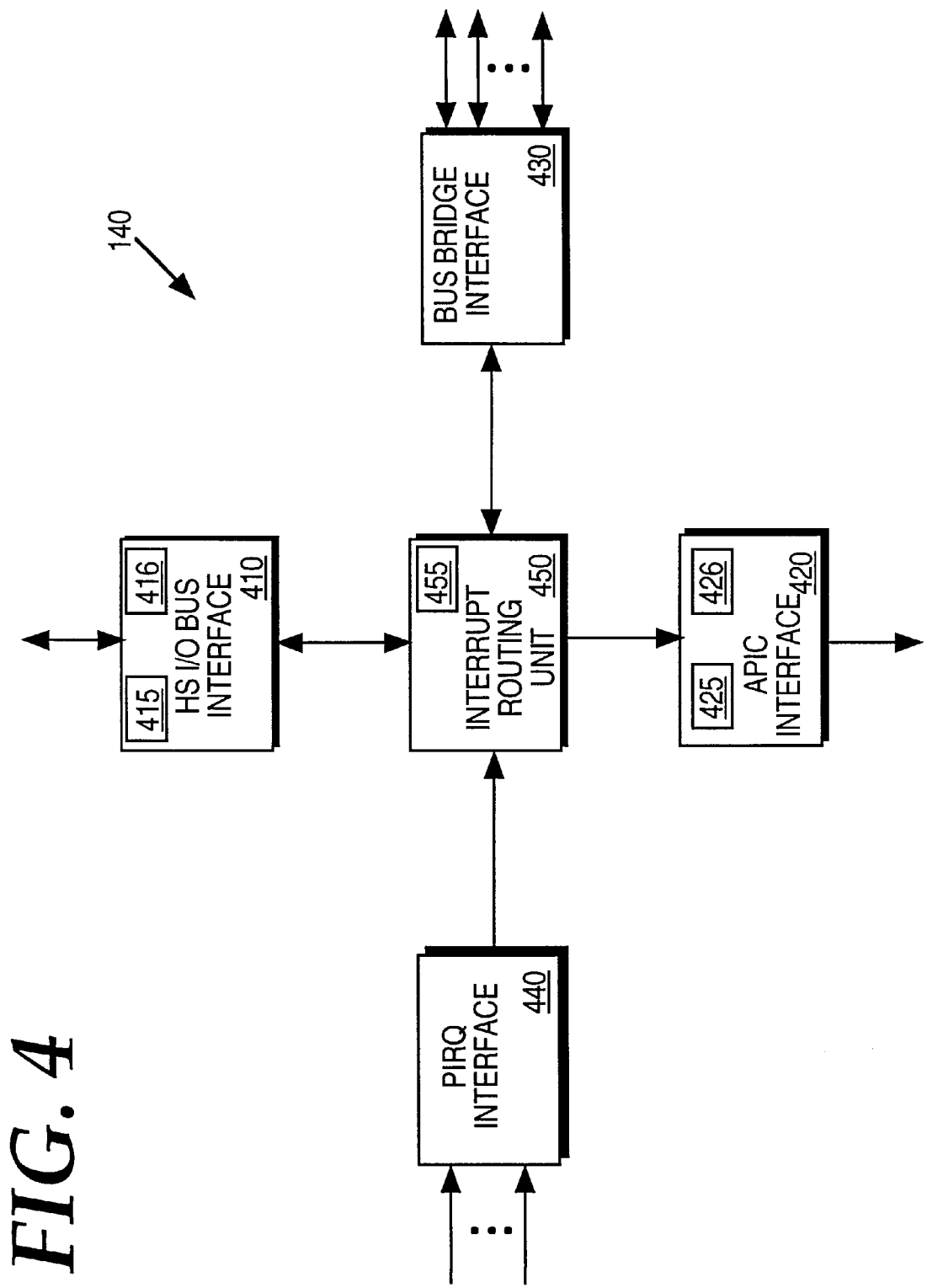
FIG. 4 illustrates a block diagram of an interrupt router according to an embodiment of the present invention.

FIG. 4 illustrates a block diagram of an interrupt router according to an embodiment of the present invention. The interrupt router 140 includes an interrupt routing unit 450. The interrupt routing unit 450 operates to route an interrupt originating from a first delivery medium to a second delivery medium. The interrupt routing unit 450 includes a routing table 455 that stores information regarding a delivery medium that an interrupt is to be routed to, information that should be forwarded with the interrupt, and how the information should be formatted. The interrupt routing unit 450 reads the information in the routing table 455 and routes the interrupt according to the information on the routing table 455. The routing table 455 is programmable to allow the interrupt router 140 to support a plurality of interrupt routing schemes. According to an embodiment of the present invention, the routing table may be programmed by set-up software such as the Basic Input Output System (BIOS) or the Operating System (OS) initialization routines. As illustrated in FIGS. 1–3, the interrupt router 140 may be used to support computer systems implementing a traditional interrupt routing scheme, an APIC interrupt routing scheme, or an SAPIC interrupt routing scheme.

A PIRQ interface 440 is coupled to the interrupt routing unit 450. The PIRQ interface operates to couple the interrupt router 140 to PIRQ lines corresponding to peripherals on the high speed I/O bus 120 (shown in FIG. 1). When a PIRQ line is asserted, the PIRQ interface 440 operates to forward a signal to the interrupt routing unit 450 indicating which PIRQ line has been asserted.

A bus bridge interface 430 is coupled to the interrupt routing unit 450. The bus bridge interface 430 operates to couple the interrupt router 140 to the bus bridge 123 (shown in FIG. 1). When the interrupt routing unit 450 maps an interrupt request delivered on a PIRQ line to the bus bridge 123, the bus bridge interface 430 operates to assert one of the plurality of IRQ lines 154 (shown in FIG. 1) as directed by the interrupt routing unit 450. The bus bridge interface 430 also operates to detect when one of the plurality of IRQ lines 354 (shown in FIG. 3) has been asserted by the bus bridge 323 and forwards a signal to the interrupt routing unit 450 indicating which IRQ line has been asserted.

An APIC interface 420 is coupled to the interrupt routing unit 450. The APIC interface 420 operates to couple the interrupt router 140 to the APIC bus 252 (shown in FIG. 2). The APIC interface 420 includes an APIC generator or I/O APIC 425 and an APIC arbitration unit 426. The APIC generator 425 operates to convert an interrupt originating from a PIRQ line to an APIC standard interrupt for routing to a processor over the APIC bus 252 (shown in FIG. 2). The APIC generator 425 converts the interrupt to an APIC standard interrupt using information regarding the interrupt in the routing table 455 in the interrupt routing unit 450. According to an embodiment of the present invention, the APIC generator 425 reformats information in the routing table 455 to a format that is transmittable on the APIC bus 252. The APIC arbitration unit 426 operates to arbitrate access to the APIC bus 252.

A high speed I/O bus interface 410 is coupled to the interrupt routing unit 450. The high speed I/O bus interface 410 operates to couple the interrupt router 140 to the high speed I/O bus 120 (shown in FIG. 3). The high speed I/O bus interface 410 includes a high speed I/O bus generator or I/O APIC 415 and a high speed I/O bus arbitrator 416. The high speed I/O bus generator 415 operates to convert an interrupt originating from a PIRQ line or an IRQ line 354 into an interrupt message and transmits the interrupt message over the high speed I/O bus 120. The interrupt message is transmitted as a posted memory write to the bus 110. The interrupt messages is generated using information regarding the interrupt in the routing table 455 in the interrupt routing unit 450. According to an embodiment of the present invention, the high speed I/O bus generator 415 reformats information retrieved from the routing table 455 into a format that is transmittable on the high speed I/O bus 120. The high speed I/O bus arbitrator 416 operates to arbitrate access to the high speed I/O bus 120.

The interrupt routing unit 450, the PIRQ interface 440, bus bridge interface 430, APIC interface 420, and the PCI interface 410 may be implemented by any known circuitry. According to one embodiment of the present invention the interrupt routing unit 450, the PIRQ interface 440, bus bridge interface 430, APIC interface 420, and the PCI interface 410 are constructed on a single semiconductor substrate.

Figure 5:
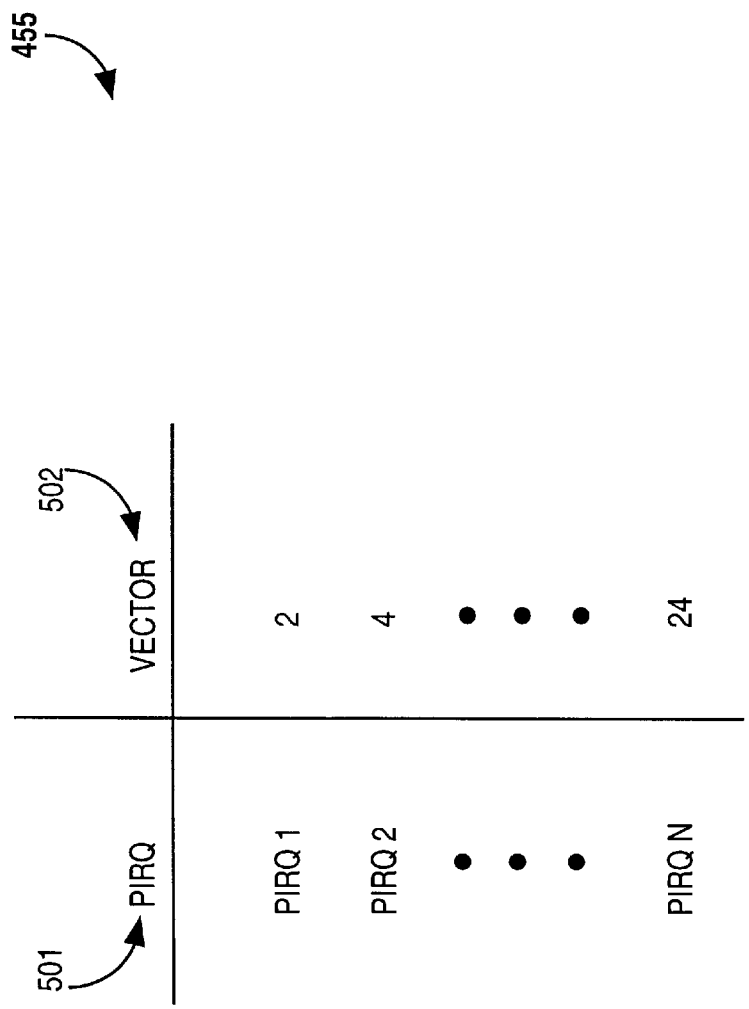
FIG. 5 illustrates an exemplary routing table in an interrupt router configured to support a computer system implementing a traditional interrupt routing scheme according to an embodiment of the present invention.

FIG. 5 illustrates an exemplary routing table 455 in an interrupt routing unit 450 (shown in FIG. 4) configured to support a computer system 100 implementing a traditional interrupt routing scheme. The routing table 455 includes a routing table entry for each PIRQ to the interrupt router 140. The routing table 455 includes a PIRQ field 501 that identifies a PIRQ to the interrupt router 140 and a vector field 502 that includes an address of a vector that identifies the PIRQ and information regarding an IRQ number that the PIRQ number is mapped to.

FIG. 6 illustrates an exemplary routing table 455 in an interrupt routing unit 450 configured to support the computer system 200 implementing an APIC interrupt routing scheme. The routing table 455 includes a routing table entry for each PIRQ to the interrupt router 140. The routing table 455 includes a PIRQ field 601 that identifies each PIRQ to the interrupt router 140 and a vector field 602 that includes an address of a vector that identifies the PIRQ and information regarding how the PIRQ is to be delivered on the APIC bus 252 (shown in FIG. 2). The routing table 455 may include a destination field 603 that stores a destination ID or APIC ID that is used to determine how the interrupt is to be serviced by the interrupt router 140. The routing table 455 may include a flush field 604 that stores a bit that controls flushing of an I/O buffer in the bridge/memory controller 111 on a per-interrupt basis. The routing table 455 may include a mask field 605 that stores a bit that controls masking the APIC delivery of an interrupt. The routing table 455 may include a trigger mode field 606 that stores a bit that indicates whether the signal on an interrupt pin that triggers an interrupt is edge sensitive or level sensitive. The routing table 455 may include a polarity field 607 that stores a bit that specifies the polarity of each PIRQ signal connected to the interrupt pins of the interrupt router 140. The vector may include a delivery mode field 608 that indicates a delivery status of an interrupt to the processor 101 (shown in FIG. 2). The vector may include a destination mode field 609 that stores a bit that determines whether a destination field should be interrupted to be in an physical or logical APIC mode. The vector may include a delivery mode field 610 that stores bits that specifies how local the APIC units listed in the destination field should act upon reception of this signal. It should be appreciated that the routing table 455 may include other fields that indicate other information regarding how to service PIRQs routed to the interrupt router 140.

Figure 7:
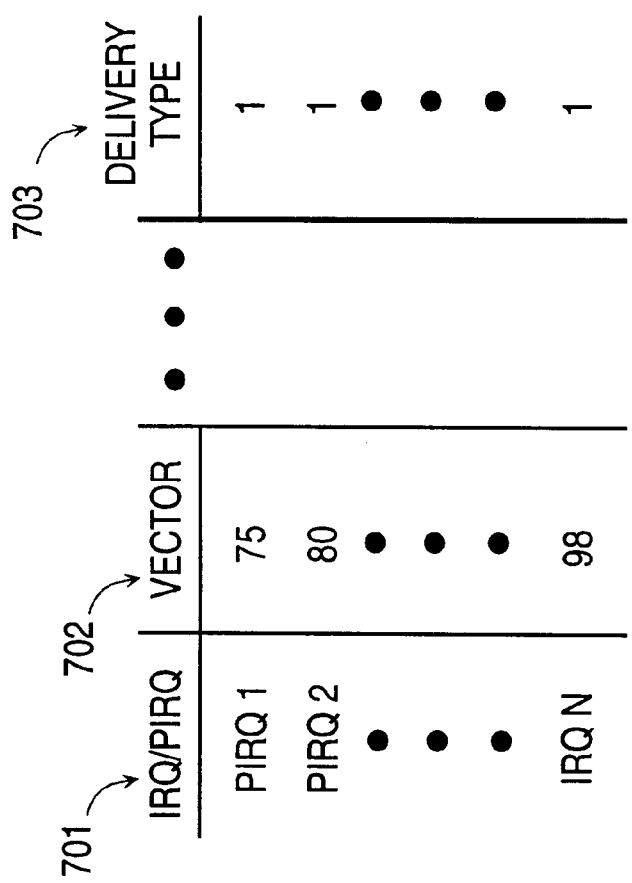
FIG. 7 illustrates an exemplary routing table in an interrupt router configured to support a computer system implementing an SAPIC interrupt routing scheme according to an embodiment of the present invention.

FIG. 7 illustrates an exemplary routing table 455 in an interrupt routing unit 450 configured to support a computer system 300 implementing an SAPIC interrupt routing scheme. The routing table 455 includes a routing table entry for each IRQ and PIRQ to the interrupt router 140. The routing table 455 includes a IRQ/PIRQ field 701 that identifies IRQ and PIRQ to the interrupt router 140 and a vector field 702 that includes an address to a vector that identifies the IRQ or PIRQ and information regarding how the IRQ or PIRQ is to be delivered on the high speed I/O bus 120 (shown in FIG. 3). In addition to including a destination field, flush field, mask field, trigger mode field, polarity field, delivery mode field, destination mode field, and delivery mode field, as described in FIG. 6, the routing table 455 is configured to support a computer system 300 implementing an SAPIC interrupt scheme may include additional fields. The routing table 455 may include a destination type field 703 that stores a bit that indicates whether the interrupt is to be delivered via an SAPIC delivery mechanism. It should be appreciated that the routing table 455 may include other fields that indicate other information regarding hows to service IRQs and PIRQs routed to the interrupt router 140.

Figure 8:
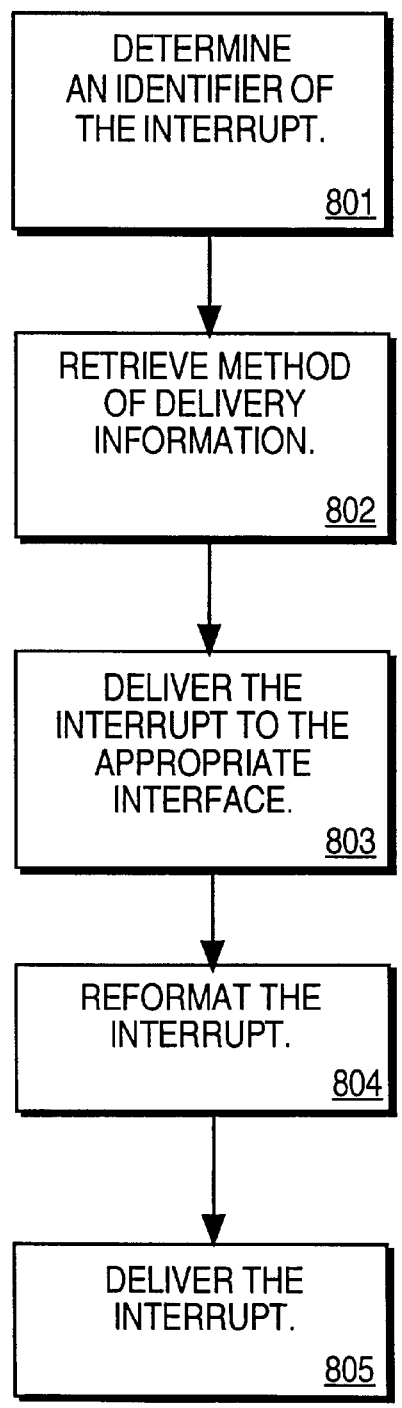
FIG. 8 is a flow chart illustrating a method of routing interrupts according to an embodiment of the present invention.

FIG. 8 is a flow chart illustrating a method for routing interrupts according to an embodiment of the present invention. At step 801, an identifier of the interrupt is determined. According to an embodiment of the present invention, the identifier may be an IRQ or PIRQ number depending on where the interrupt originated from. If the interrupt is from a peripheral on the PCI bus, the identifier is a PIRQ number. If the interrupt is from a peripheral on an ISA or EISA bus, the identifier is a IRQ number.

At step 802, method of delivery information relating to the interrupt is determined. According to an embodiment of the present invention, the method of delivery information is retrieved from a routing table in an interrupt router. According to an embodiment of the present invention, the method of delivery information may include a delivery medium which the interrupt is to be delivered on and how to format the interrupt to be delivered on that delivery medium.

At step 803, the interrupt is delivered to the appropriate interface. According to a first embodiment of the present invention, if the method of delivery information indicates that the interrupt is to be delivered on an APIC bus, the interrupt is delivered to the APIC interface. According to a second embodiment of the present invention, if the method of delivery information indicates that the interrupt is to be delivered on an IRQ line, the interrupt is delivered to the bridge controller interface. According to a third embodiment of the present invention, if the method of deliver information indicates that the interrupt is to be delivered on the PCI bus, the interrupt is delivered to the PCI interface.

At step 804, the interrupt is reformatted to a format transmittable on the delivery medium. According to an embodiment of the present invention, the interrupt is reformatted by the appropriate interface. Information regarding how the interrupt is to be reformatted is retrieved from the routing table in the interrupt router. Additional information regarding the interrupt may be retrieved from the routing table and be reformatted to an interrupt message to be transmitted with the interrupt on the delivery medium.

At step 805, the interrupt is delivered on the appropriate medium determined by the information in the routing table. According to an embodiment of the present invention, the interrupt may be delivered on an IRQ line, an APIC bus, or a PCI bus.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An interrupt router, comprising:
    a first interface coupled to a first interrupt delivery medium;
    a second interface coupled to a second interrupt delivery medium that is of a different medium type than the first interrupt delivery medium; and
    an interrupt routing unit, coupled to the first interface and the second interface, that routes interrupts originating from the first interrupt delivery medium and the second interrupt delivery medium onto an input/output (I/O) bus to be delivered to a processor, through message transactions on the I/O bus and without employment of side-band communication outside of said I/O bus.

2. The interrupt router of claim 1, wherein the first interface is a Peripheral Components Interconnect interrupt request (PIRQ) interface and the first interrupt delivery medium is a PIRQ line.

3. The interrupt router of claim 1, wherein the second interface is a bridge controller interface and the second interrupt delivery medium is a interrupt request line (IRQ).

4. The interrupt router of claim 1, wherein the I/O bus is a Peripheral Components Interconnect (PCI) bus.

5. An interrupt router, comprising:
    a Peripheral Components Interconnect interrupt request (PIRQ) interface that couples the interrupt router to a PIRQ line;
    a bridge controller interface that couples the interrupt router to an interrupt request (IRQ) line; and
    an interrupt routing unit, coupled to the PIRQ interface and the bridge controller interface, that routes interrupts originating from the PIRQ line and the IRQ line directly onto a Peripheral Components Interconnect (PCI) bus to be delivered to a processor, through message transactions on said PCI bus and without employment of side-band communication outside of said PCI bus.

6. The interrupt router of claim 5, wherein the interrupt routing unit comprises a routing table that stores information regarding interrupts originating from the PIRQ line and the IRQ line.

7. The interrupt router of claim 6, further comprising a PCI bus interface, coupled to the interrupt routing unit, that reformats information retrieved from the interrupt routing unit regarding the interrupts into a format that is transmittable on the PCI bus.

8. An interrupt router, comprising:
    a Peripheral Components Interconnect (PCI) bus interface;
    an Advanced Programmable Interrupt Controller (APIC) bus interface;
    a bridge controller interface; and
    an interrupt routing unit, coupled to the PCI bus interface, the APIC bus interface, and the bridge controller interface, that is programmable to route a first interrupt request from a peripheral on a PCI bus to one of the bridge controller interface, the APIC bus interface, or the PCI interface for delivery to a processor, wherein when programmed to route the first interrupt to the PCI interface, the interrupt routing unit routes the first interrupt directly onto the PCI bus for delivery to the processor, through message transactions on the PCI bus and without employment of side-band communication outside of said PCI bus.

9. The interrupt router of claim 8, wherein the interrupt routing unit comprises a programmable routing table that includes information regarding a delivery medium to route the first interrupt.

10. The interrupt router of claim 8, wherein the PCI bus interface comprises a PCI generator unit that reformats data retrieved from the interrupt routing unit into a format that is transmittable on the PCI bus.

11. The interrupt router unit of claim 8, wherein the PCI bus interface comprises an arbitration unit that arbitrates access to the PCI bus.

12. The interrupt router unit of claim 8, wherein the APIC bus interface comprises an APIC generator that reformats data retrieved from the interrupt routing unit into a format that is transmittable on the APIC bus.

13. The interrupt router unit of claim 8, wherein the APIC bus interface comprises an arbitration unit that arbitrates access to the APIC bus.

14. The interrupt router unit of claim 8, further comprising a PIRQ interface unit coupled to the interrupt routing unit that interfaces the interrupt router to a peripheral on the PCI bus.

15. A computer system, comprising:
a CPU bus;
a processor, coupled to the CPU bus;
a bridge memory controller, coupled to the CPU bus;
a Peripheral Components Interconnect (PCI) bus, coupled to the bridge memory controller;
an interrupt router, coupled to the PCI bus, including a PCI bus interface, an Advanced Programmable Interrupt Controller (APIC) bus interface, a bridge controller interface, and an interrupt routing unit that is programmable to route a first interrupt request from a peripheral on the PCI bus to one of the bridge controller interface, the APIC bus interface, or the PCI interface for delivery to a processor, wherein when programmed to route the first interrupt to the PCI bus interface, the interrupt routing unit routes the first interrupt directly onto the PCI bus for delivery to the processor, through message transactions on the PCI bus and without employment of side-band communication outside of said PCI bus.

16. The computer system of claim 15, wherein the interrupt router comprises a routing table listing information regarding a delivery medium to route one of the first and second interrupt.

17. The computer system of claim 15, wherein the PCI bus interface comprises a PCI generator unit that reformats data retrieved from the interrupt routing unit into a format that is transmittable on the PCI bus.

18. The computer system of claim 15, wherein the PCI bus interface comprises an arbitration unit that arbitrates access to the PCI bus.

19. The computer system of claim 15, wherein the APIC bus interface comprises an APIC generator that reformats data retrieved from the interrupt routing unit into a format that is transmittable on the APIC bus.

20. The computer system of claim 15, wherein the APIC bus interface comprises an arbitration unit that arbitrates access to the APIC bus.

21. The computer system of claim 15, further comprising a PIRQ interface unit, coupled to the interrupt routing unit, that interfaces the interrupt router to a peripheral on the PCI bus.

22. A method for routing interrupts, comprising:
retrieving method of delivery information from an interrupt routing table on an interrupt controller for an interrupt originating from one of a Peripheral Component Interconnect interrupt request (PIRQ) line and an interrupt request (IRQ) line; and
delivering the interrupt from the interrupt controller to one of the IRQ line, Advanced Programmable interrupt Controller (APIC) bus, and Peripheral Component Interconnect (PCI) bus for delivery to a processor, based on the method of delivery information, wherein when delivering the interrupt to the PCI bus, the interrupt routing unit routes the first interrupt directly onto the PCI bus for delivery to the processor, through message transactions on the PCI bus and without employment of side-band communication outside of said PCI bus.

23. The method of claim 22 further comprising the steps of:
retrieving data from the interrupt routing table regarding the interrupt; and
reformatting the data to be transmittable on a PCI bus.

24. The method of claim 23 further comprising the step of arbitrating access to the PCI bus and sending the reformatted data on the PCI bus.

25. The method of claim 22 further comprising the steps of:
retrieving data from the interrupt routing table regarding the interrupt; and
reformatting the data to be transmittable on the APIC bus.

26. The method of claim 25 further comprising the step of arbitrating access to the APIC bus and sending the reformatted data on the APIC bus.

27. The method of claim 22 further comprising the step of asserting the IRQ line corresponding to the interrupt.

28. A method of routing interrupts, comprising:
retrieving method of delivery information from an interrupt routing table on an interrupt controller for an interrupt originating from a peripheral on a Peripheral Components Interconnect bus (PCI), an Industry Standard Architecture (ISA) bus, or an Extended Industry Standard Architecture (EISA);
delivering the interrupt to one of a PCI bus interface, an Advanced Programmable Interrupt Controller (APIC) bus interface, or a bus bridge interface for delivery to a processor based on the method of delivery information, wherein when delivering the interrupt to the PCI bus, the interrupt routing unit routes the first interrupt directly onto the PCI bus for delivery to the processor, through message transactions on the PCI bus and without employment of side-band communication outside of said PCI bus.

29. An interrupt controller, comprising:
a first bus interface to a first interrupt forwarding mechanism;
a second bus interface to a second interrupt forwarding mechanism of a different interrupt forwarding mechanism type than the first interrupt forwarding mechanism;
a bridge controller interface to a third interrupt forwarding mechanism of yet another different interrupt forwarding mechanism type than the first and second interrupt forwarding mechanism; and an interrupt routing unit, coupled to the first bus interface, the second bus interface, and the bridge controller interface, that is programmable to route an interrupt request from a peripheral to one of the first bus interface, the second bus interface, or the bridge controller interface for delivery to a processor, wherein when programmed to route the interrupt to the first bus, the interrupt routing unit routes the interrupt directly onto the first bus for delivery to the processor, through message transactions on the first bus and without employment of side-band communication outside of said first bus.

30. The interrupt router of claim 29, wherein the interrupt routing unit comprises a programmable routing table that includes information regarding a delivery medium to route the interrupt.

* * * * *